(12) United States Patent
Brünnert et al.

(10) Patent No.: US 7,764,755 B2
(45) Date of Patent: Jul. 27, 2010

(54) SYNCHRONIZATION OF A DIGITAL CIRCUIT

(75) Inventors: Michael Brünnert, Munich (DE); Paul Georg Lindt, Donauwörth (DE)

(73) Assignee: Qimonda AG, Munich (DE)

( * ) Notice: Subject to any disclaimer, the term of this patent is extended or adjusted under 35 U.S.C. 154(b) by 886 days.

(21) Appl. No.: 11/644,084

(22) Filed: Dec. 22, 2006

(65) Prior Publication Data

US 2007/0147563 A1    Jun. 28, 2007

(30) Foreign Application Priority Data

Dec. 23, 2005   (DE) .................. 10 2005 061 947

(51) Int. Cl.
*H04L 7/00* (2006.01)
(52) U.S. Cl. .................. 375/354; 375/377; 327/3; 327/141; 327/236
(58) Field of Classification Search ........... 375/354, 375/377; 327/2, 3, 141, 161, 231, 233, 236
See application file for complete search history.

(56) References Cited

U.S. PATENT DOCUMENTS

| | | |
|---|---|---|
| 6,323,716 B1 | 11/2001 | Sakamoto |
| 7,002,376 B2* | 2/2006 | Adkisson ............... 327/12 |
| 7,483,499 B2* | 1/2009 | Schrodinger ........... 375/345 |
| 7,613,254 B2* | 11/2009 | Moriizumi ............. 375/332 |

FOREIGN PATENT DOCUMENTS

| | | |
|---|---|---|
| DE | 19510038 | 8/1996 |
| WO | 0223715 | 3/2002 |

* cited by examiner

*Primary Examiner*—Dac V Ha
(74) *Attorney, Agent, or Firm*—Dicke, Billig & Czaja, PLLC

(57) ABSTRACT

A method of synchronization of a digital circuit includes selecting a first site and a second site from a plurality of different sites of the digital circuit where a signal to be synchronized occurs; passing a first signal, which is the signal to be synchronized of the first site, via a first line that starts at the first site, ends at the second site, and contacts each of the sites just once, to the second site; passing a second signal, which is the signal to be synchronized of the second site, via a second line that starts at the second site, ends at the first site, and contacts each of the sites just once, to the first site; determining, for each site, a first phase shift between the signal to be synchronized of this site and the first signal, and a second phase shift between the signal to be synchronized of this site and the second signal; and determining, from the first and second phase shifts of each site, a delay for each site, with which the signal to be synchronized of the respective site is delayed for the synchronization.

24 Claims, 7 Drawing Sheets

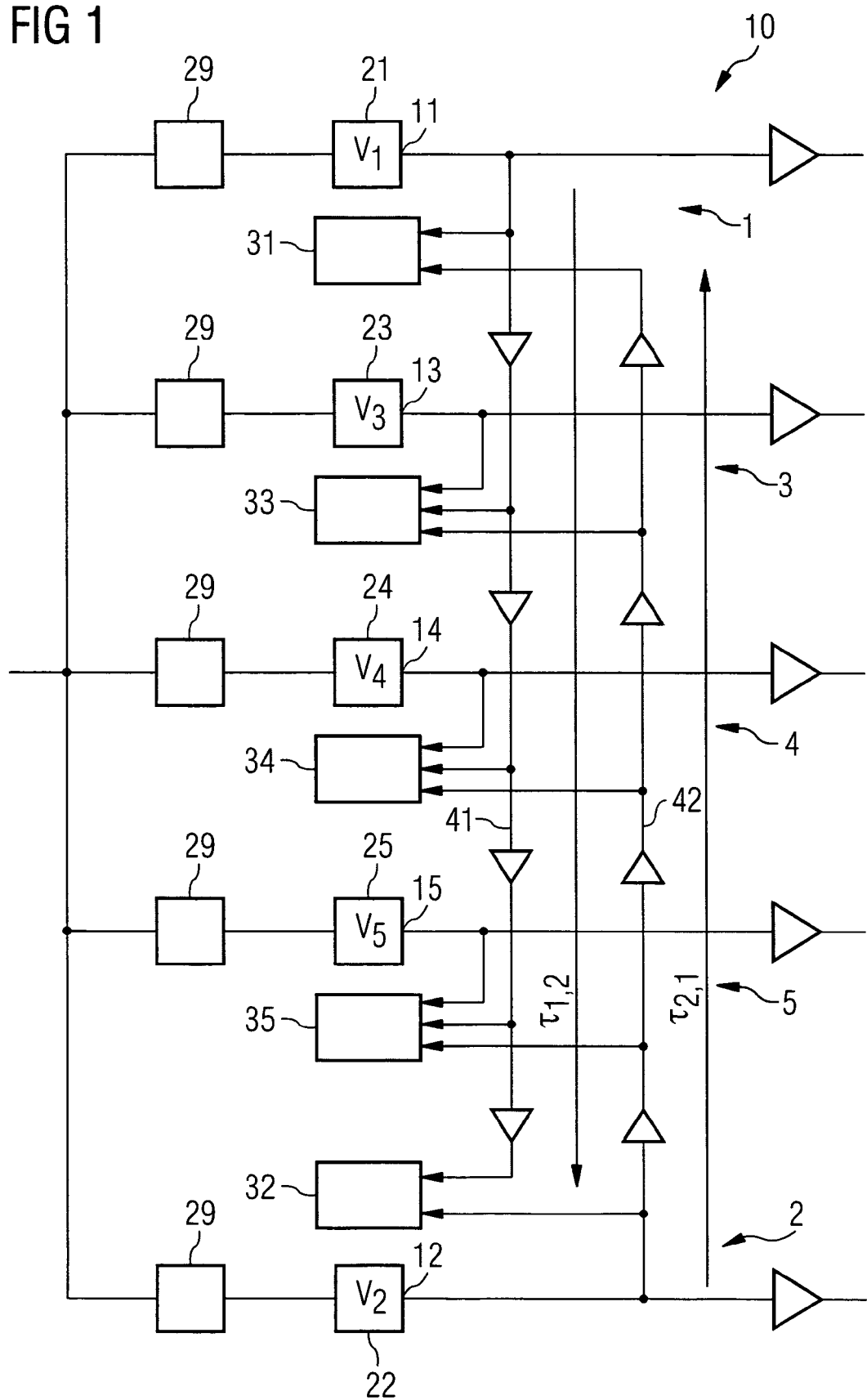

SYNCHRONIZATION OF A DIGITAL CIRCUIT

CROSS-REFERENCE TO RELATED APPLICATIONS

This Utility Patent Application claims priority to German Patent Application No. DE 10 2005 061 947.9 filed on Dec. 23, 2005, which is incorporated herein by reference.

BACKGROUND

Parallel high-speed interfaces have strictly defined relative timing of their signals. This means that all data signals and associated clock (timing) signals (insofar as they exist) lie or are synchronized within a certain time window in order to ensure a correct acquisition of all data signals. Depending on this time window, which is defined for example by standardization or customer needs, the physical distribution of signals relevant as regards the timing is a dominating factor in maintaining the conditions of the time window and the synchronization conditions. At the same time, the timing definitions with regard to the time window may be negatively influenced if the corresponding signals pass through circuit blocks that influence the timing of the signals. Also, variations in the method for producing the high-speed interface, in which different sites of the high-speed interface may be variously affected, can further complicate the timing definitions with regard to synchronization of the signals to be made available by the high-speed interface.

Accordingly, expensive measuring devices are typically used in order to synchronize the signals of a parallel high-speed interface. Since the use of these measuring devices is not practicable on account of their mass production costs, it is customary to restrict a maximum data rate of a parallel high-speed interface so that the signals of the parallel high-speed interface can be transmitted correctly (i.e., without a misalignment between the signals leading to errors). In other words, it is normal practice to reduce the clock rate of a parallel high-speed interface until no errors with regards to the synchronization of its signals occur, and instead of improving the synchronization of the signals. This reduction of the clock rate obviously has a negative effect in terms of a lower overall throughput of a digital circuit that includes such a parallel high-speed interface.

For these and other reasons there is a need for the present invention.

SUMMARY

One embodiment provides a method of synchronization of a digital circuit. The method includes selecting a first site and a second site from a plurality of different sites of the digital circuit where a signal to be synchronized occurs. The method includes passing a first signal, which is the signal to be synchronized of the first site, via a first line that starts at the first site, ends at the second site, and contacts each of the sites just once, to the second site. The method includes passing a second signal, which is the signal to be synchronized of the second site, via a second line that starts at the second site, ends at the first site, and contacts each of the sites just once, to the first site. The method includes determining, for each site, a first phase shift between the signal to be synchronized of this site and the first signal, and a second phase shift between the signal to be synchronized of this site and the second signal; and determining, from the first and second phase shifts of each site, a delay for each site, with which the signal to be synchronized of the respective site is delayed for the synchronization.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 illustrates an embodiment of an apparatus according to the invention.

DETAILED DESCRIPTION

Figure 2A:
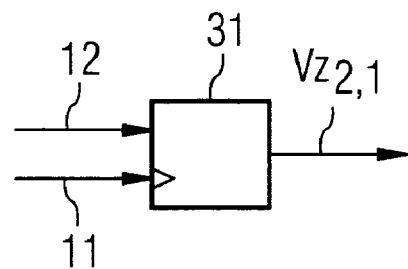
FIG. 2a illustrates a first detector device at a first site.

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments relate to a synchronization method as well as to a correspondingly configured apparatus and a digital circuit and also an automatic apparatus for the synchronization of a digital circuit. One embodiment of a digital circuit is designed to either synchronize itself with a synchronization method according embodiment, or be synchronized, for example by an automatic apparatus embodiment via the synchronization method embodiment.

One embodiment of a synchronization method synchronizes signals of, for example, a parallel high-speed interface. One embodiment, of a digital circuit comprises a parallel high-speed interface and the signals of the parallel high-speed interface can be synchronized.

One embodiment of a synchronization method for a digital circuit wherein signals to be synchronized occur at a plurality of different sites or locations of the digital circuit. A signal to be synchronized is present at each of these several sites. According to this embodiment, of the plurality of sites a first site and a second site are defined. A path is then defined, which starts at the first site, ends at the second site, and touches each of the sites just once. A first signal, which is the signal to be synchronized of the first site, is passed via a first line, which begins at the first site, runs along the path and ends at the second site, to the second site. In a similar way, a second signal, which is the signal to be synchronized of the second site, is passed via a second line, which begins at the second site, ends at the first site and is guided along the path, to the first site. At each site a first phase shift between the signal to be synchronized of this site and the first signal, and a second phase shift between the signal to be synchronized of this site and the second signal, is measured. On the basis of this first and second phase shift for each site an individual delay is then determined for each site. When the signal to be synchronized of the respective site is delayed with the corresponding individual delay of this site, the signals at the plurality of sites are synchronized.

In one embodiment, two or more signals may be synchronized with respect to one another at corresponding sites if they exhibit their upward slope and downward slope at the same point in time at the corresponding sites.

The method according to one embodiment operates better the more closely a running time of the first signal from the first site to the second site coincides with a running time of the second signal from the second site to the first site. Accordingly, in one embodiment it is advantageous if the first line and the second line run as close to one another as possible, so that the running times of the signals running on the first and second lines (first and second signals) are as identical as possible.

A site or location may in this context be understood to denote a circuit point or a narrowly defined space, the traversal of which by a signal of the digital circuit for example takes less than 1 ps. However, other definitions are possible as well depending on the respective application.

In one embodiment, the first and the second site basically form an exception, in that at the first site only the second phase shift between the first and the second signals needs to be formed, and at the second site only the first phase shift between the first and the second signals needs to be formed. This is based on the fact that at the first site the signal to be synchronized is the first signal, so that a phase shift between the signal to be synchronized and the first signal would be equal to a phase shift between the first signal and the first signal, which by definition is always zero, with a result that the calculation of this first phase shift at the first site provides no additional information. The same is also true with regards to the second site.

Since, according to one embodiment, at two sites at which a signal to be synchronized is present, one phase shift is determined in each case, and at the remaining sites at which a signal to be synchronized is present two phase shifts are determined, then all signals to be synchronized can be synchronized, as is also demonstrated below.

According to another embodiment, the first signal at the first site can be synchronized with the second signal at the second site if only the second phase shift $x_{2,1}$ at the first site and the first phase shift $x_{1,2}$ at the second site are determined. In one embodiment, it is assumed that the running time of the first signal up to the first site is $T_1$ and that the running time of the second signal up to the second site is $T_2$. It is furthermore assumed that the running time of the first signal from the first site via the first line to the second site is $T_{1,2}$, and that the running time of the second signal from the second site via the second line up to the first site is $T_{2,1}$. Thus, the following equations are valid for the first phase shift at the second site $x_{1,2}$ and for the second phase shift at the first site $x_{2,1}$.

In the index of the phase shift x the first value indicates whether the first (1) or second (2) phase shift is involved, and the second value indicates the site at which the phase shift occurs. The phase shift $x_{2,1}$ thus indicates the second phase shift at the first site.

$$x_{2,1} = T_1 - (T_2 + T_{2,1}) \quad (1)$$

$$x_{1,2} = T_2 - (T_1 + T_{1,2}) \quad (2)$$

The second phase shift $x_{2,1}$ at the first site is therefore positive so long as the running time $T_1$ of the first signal up to the first site is longer than the sum of the running time $T_2$ of the second signal up to the second site and the running time $T_{2,1}$ of the second signal from the second site to the first site. Similarly, the first phase shift $x_{1,2}$ at the second site is positive so long as the running time $T_2$ of the second signal up to the second site is longer than the sum of the running time $T_1$ of the first signal up to the first site and the running time $T_{1,2}$ of the first signal from the first site to the second site.

Subtracting the first phase shift $x_{1,2}$ at the second site from the second phase shift $x_{2,1}$ at the first site gives the following result:

$$x_{2,1} - x_{1,2} = T_1 - T_2 - T_{2,1} - T_2 + T_1 + T_{1,2} \quad (3)$$

Assuming that the running time $T_{1,2}$ of the first signal via the first line to within an error $\epsilon$ is equal to the running time $T_{2,1}$ of the second signal via the second line, then:

$$T_{2,1} = T_{1,2} + \epsilon \quad (4)$$

If one ignores the error $\epsilon$, then the following result is obtained by combining equation (3) with equation (4):

$$x_{2,1} - x_{1,2} = 2 \times (T_1 - T_2) \quad (5)$$

Thus, the following is found for the phase shift between the first signal at the first site and the second signal at the second site, this phase shift being equal to a running time difference between the running time $T_1$ of the first signal up to the first site and the running time $T_2$ of the second signal up to the second site:

$$T_1 - T_2 = \frac{x_{2,1} - x_{1,2}}{2} \quad (6)$$

Thus, according to this embodiment the first signal can be synchronized with the second signal if the second signal is delayed according to the above equation (6) with a delay that is equal to half the difference of the second phase shift at the first site and the first phase shift at the second site. In the same way, according to equation (6) given above the first signal can be delayed with a delay that is equal to half the difference of the first phase shift at the second site and the second phase shift at the first site. Since the delay according to equation (6) given above may also assume negative values, it is in practice more sensible to decide whether the first phase shift at the second site or the second phase shift at the first site is larger, and to delay the signal accordingly, which is quicker.

It follows from this that if the first phase shift $x_{1,2}$ at the second site is larger than the second phase shift $x_{2,1}$ at the first site, then the second signal is slower than the first signal or the first signal is faster than the second signal. Conversely, if the first phase shift $x_{1,2}$ at the second site is smaller than the second phase shift $x_{2,1}$ at the first site, then the first signal is slower than the second signal or the second signal is faster than the first signal. Accordingly, if the first phase shift $x_{1,2}$ at the second site is larger than the second phase shift $x_{2,1}$ at the first site, then the first signal is delayed by half the difference of the first phase shift $x_{1,2}$ at the second site and the second phase shift $x_{2,1}$ at the first site, whereas if the first phase shift $x_{1,2}$ at the second site is smaller than the second phase shift $x_{2,1}$ at the first site, the second signal is delayed by half the difference of the second phase shift $x_{2,1}$ at the first site and the first phase shift $x_{1,2}$ at the second site.

Accordingly, in one embodiment, it is possible to synchronize the first and second signals even if only the second phase shift is present or determined at the first site and only the first phase shift is present or determined at the second site, because as has already been described above, at the first site the first phase shift is by definition always 0 and at the second site the second phase shift is by definition always 0, and accordingly no additional information is provided.

If equation (1) and equation (2) are added, then the following equation is obtained:

$$x_{2,1} + x_{1,2} = -T_{2,1} - T_{1,2} \quad (7)$$

Since if the error $\epsilon$ is ignored, then according to equation (4) $T_{2,1}$ is equal to $T_{1,2}$, the running time $T_{1,2}$ of the first signal from the first site up to the second site via the first line and thus the running time $T_{2,1}$ of the second signal from the second site up to the first site via the second line can be calculated as follows:

$$T_{1,2} = T_{2,1} = -\frac{x_{1,2} + x_{2,1}}{2} \quad (8)$$

In another embodiment, according to the invention is described hereinafter, the delay of the ith site is determined with the aid of the first and second phase shifts of this ith site. In this embodiment, it is assumed that the first signal at the first site has been synchronized beforehand with the second signal at the second site. Under this assumption and using equation (4) and assuming that $\epsilon$ can be ignored, a running time difference $\Delta t_i$ between the second signal and the first signal at the ith site can be calculated with the aid of a running time $T_{1,i}$ of the first signal from the first site up to the ith site according to the following equation:

$$\Delta t_i = (T_{2,1} - T_{1,i}) - T_{1,i} \quad (9)$$

Figure 6:
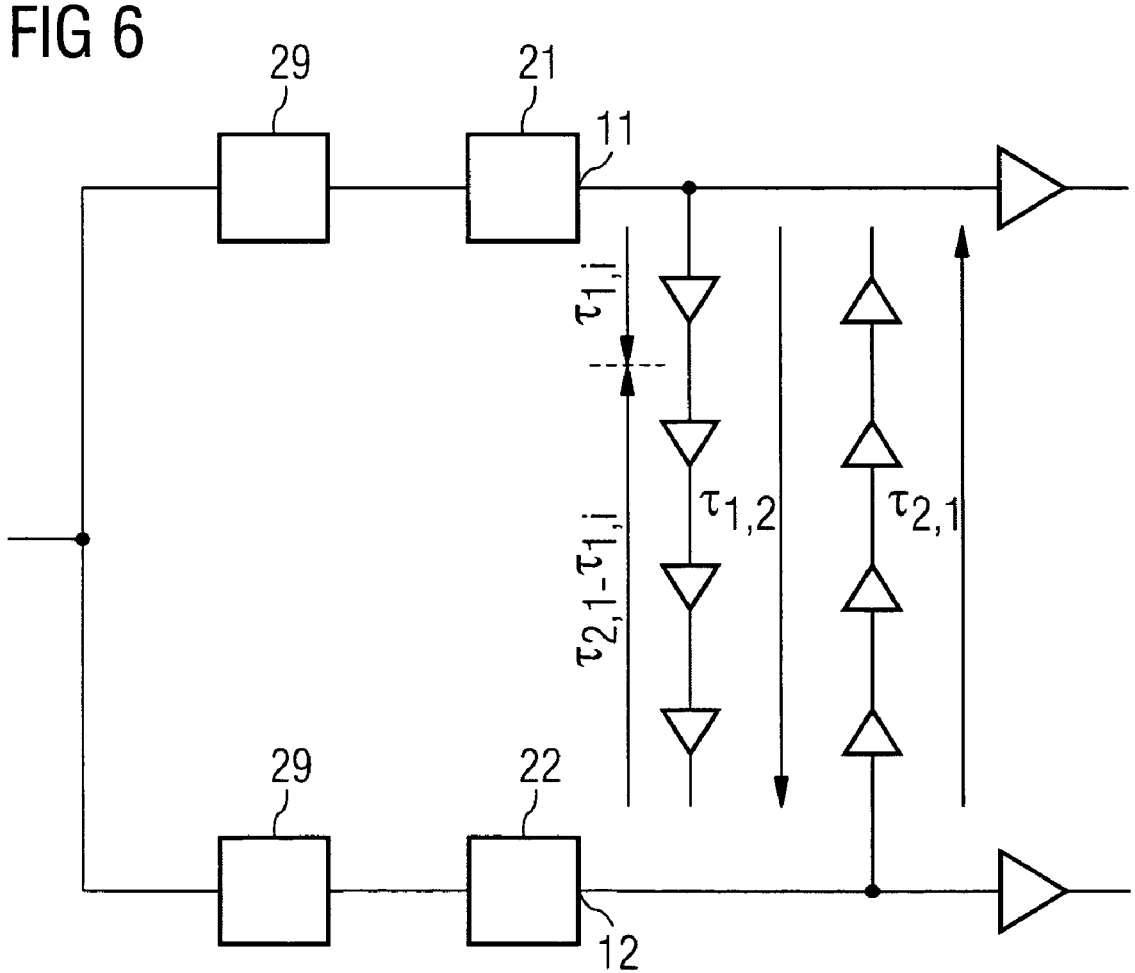
FIG. 6 illustrates a synchronization of an ith signal.

This state of affairs is also illustrated in FIG. 6, in which the ith site is identified by a cross and a dotted line. The term $(T_{2,1} - T_{1,i})$ denotes the running time $T_{2,i}$ of the second signal on the second line from the second site up to the ith site.

If equation (9) is solved for the running time $T_{1,i}$ of the first signal from the first site up to the ith site, the following equation (10) is obtained:

$$T_{1,i} = \frac{T_{2,1} - \Delta t_i}{2} \quad (10)$$

The running time difference $\Delta t_i$ between the first signal and the second signal at the ith site can, assuming that the two signals are synchronized, as is described hereinbefore, also be determined by the difference of the first phase shift $x_{1,i}$ between the first signal and the ith signal at the ith site and the second phase shift $x_{2,i}$ between the second signal and the ith signal at the ith site, which results in the following equation (11):

$$\Delta t_i = x_{1,i} - x_{2,i} \quad (11)$$

If equation (11) is substituted in equation (10), then the following equation is obtained:

$$T_{1,i} = \frac{T_{2,1} - (x_{1,i} - x_{2,i})}{2} \quad (12)$$

If the running time $T_{1,i}$ is subtracted from the first phase shift $x_{1,i}$ at the ith site, a delay $V_i$ is obtained so as to synchronize the ith signal at the ith site with the first signal at the first site and thus with the second signal at the second site.

$$V_i = x_{1,i} - \frac{T_{2,1} - (x_{1,i} - x_{2,i})}{2} \quad (13)$$

Thus, assuming that the first signal at the first site has been synchronized with the second signal at the second site, an individual delay can be determined for each signal by means of equation (13), so that if each signal is delayed with the individual delay calculated in this way, then all signals are synchronized with one another. More accurately, the pulsing with the individual delay ensures that the first signal at the first site, each ith signal at the corresponding ith site, and the second signal at the second site are synchronized with one another, (i.e., they exhibit their upward and downward slopes at the same point in time).

In one embodiment, the signals are synchronized in an advantageous manner with a method embodiment, regardless of how the running time differences between the signals arrive. This means that even if the signals are derived for example from different (e.g., non-synchronized) sources or have to traverse variously long paths up to the corresponding site, the signals can be synchronised by the method embodiment.

In one embodiment of an apparatus for the synchronization of a digital circuit signals at a plurality of sites of the digital circuit are synchronized. Expressed differently, the first signal at the first site of the digital circuit, the second signal at the second site of the digital circuit and the ith signal at the ith site of the digital circuit are synchronized with one another, as has already been explained above in the description of the method embodiment. One embodiment of an apparatus comprises at the first site a detector device and at the second site similarly a detector device, and at the remaining sites (ith sites) in each case a first detector device and a second detector device. Each of these detector devices is designed to determine a sign of a phase shift between two signals that are present at two inputs of the respective detector device. At the same time the signal to be synchronized at the site at which the detector device is arranged can be passed to each detector device. Moreover, at each site the device comprises a delay device with which the signal to be synchronized at this site can be delayed with a corresponding individual delay. The device comprises a first line and a second line. The first line runs from the first site up to an input of the detector device at the second site, to which it is connected. In a similar manner, the second line runs from the second site up to an input of the detector device of the first site, to which it is connected. In this way at the first site the signal to be synchronized there can be fed to the first line, and at the second site the signal to be synchronized can be fed to the second line at the second site. In addition the first line is in each case connected to an input of the first detector device at each ith site, (i.e., each site apart from the first and second sites). In a similar way, the second line is in each case connected to an input of the second detector device at each ith site, (i.e., each site up to the first and second sites).

Accordingly one apparatus embodiment is designed in such a way that the first signal at the first site can be synchronized with the second signal at the second site and with each corresponding signal at the remaining sites, via, for example, a method embodiment described above.

One embodiment of a digital circuit comprises an apparatus embodiment similar to as described above, for the synchronization of a plurality of signals at a plurality of sites of the digital circuit.

Delay devices are frequently already present in digital circuits, in order to be able to influence the running time of signals. In this case, an apparatus according to embodiments uses these delay devices or the digital circuit instead of its own devices.

In order to synchronize the plurality of signals with one another at the plurality of sites of the digital circuit, there are two variants according to embodiments, for the apparatus embodiment as well as for the digital circuit embodiment. In the first variant the apparatus embodiment or the digital circuit embodiment includes a control that is designed so that it executes one of the previously described embodiments of the method for the synchronization of a digital circuit. In the second variant, the apparatus embodiment or the digital circuit embodiment is designed so that the results of the detector devices can be accessed externally (i.e., from outside the apparatus or the digital circuit) and so that the delay devices can be adjusted externally. In this second variant, a method according to one embodiment for the synchronization outside the apparatus or the digital circuit is for example implemented for the synchronization of the plurality of signals, in which as input for this method embodiment the corresponding output values of the detector devices are used, and wherein the delay devices of the apparatus or the digital circuit are then appropriately adjusted corresponding to the results of the method embodiment, so that after this adjustment the plurality of signals are synchronized with one another.

One embodiment of an automatic apparatus can synchronize a digital circuit. This embodiment of an automatic apparatus according to the invention is designed so that the signs of the detector devices of the digital circuit can be supplied to it, and so that it can drive the delay devices of the digital circuit. The automatic apparatus is thus able to calculate the individual delays for each signal and then to adjust these individual delays with the aid of the delay devices.

This automatic apparatus embodiment may in a simple variant be designed in such a way that it successively determines the phase shifts at each site, which although it is more time-intensive, nevertheless advantageously has only a simpler configuration of the automatic apparatus embodiment. In a more complicated variant, the automatic apparatus according to one embodiment is designed so that it simultaneously determines the phase shifts at least two sites. This complicated variant can overall determine the phase shifts at all sites therefore more quickly than the simple variant. Similarly, there is a simple variant of the automatic apparatus embodiment in which the individual delays at each site are adjusted in succession. In a more complicated variant at least two individual delays are simultaneously adjusted. Whereas the advantage of the simple variant is the cheaper design of the automatic apparatus, the advantage of the more complicated variant is the quicker adjustment of the individual delays and thus a shorter length of time needed to carry out the synchronization of the plurality of signals of the digital circuit.

Memory interfaces operating with a double data rate (DDR) for example can be synchronized with embodiments. These memory interfaces are used for example with fully buffered dual-in-line storage modules (FBD). Embodiments are not restricted to this area of application, since the invention can also be used for the synchronization of signals of any arbitrary digital circuit. In one embodiment, the digital circuit embodiment may for example be a microelectronic circuit or an assembly comprising a plurality of microelectronic circuits.

Hereinafter, embodiments are described in more detail with reference to the drawings.

FIG. 1 illustrates an apparatus 10 according to one embodiment for the synchronization of five different signals 11-15 at five different sites 1-5 within a digital circuit. In FIG. 1, the reference numeral 29 denotes diagrammatically an individual running time for each signal 11-15, which each signal 11-15 has when it reaches its corresponding site 1-5 (although the reference numeral is used for each signal path, each individual running time has a different value). Knowledge of this individual running time is unknown, since otherwise the synchronization of the signals 11-15 would be trivial. A delay device 21-25, with which each signal can be delayed with an individual delay in order to synchronize the five signals 11-15 with one another, is associated with each signal 11-15. A detector device 31, 32 is in each case associated with the first signal 11 and with the second signal 12, while a first detector device and a second detector device, which however are identified only jointly with a reference numeral 33-35, are associated in each case with the remaining signals 3-5. A first line 41 connects the first signal 11 from the first site 1 to an input of the detector device 31 of the first site 1, to an input of the in each case first detector device of the third site 3, of the fourth site 4 and of the fifth site 5, as well as to an input of the detector device 32 of the second site 2. In a similar way, a second line 42 connects the second signal 12 from the second site 2 to an input of the detector device 32 of the second site 2, to an input of the in each case second detector device of the fifth site 5, of the fourth site 4, and of the third site 3, as well as to an input of the detector device 31 of the first site 1. The running time that the first signal 11 takes from the first site 1 up to the input of the detector device of the second site 2 is denoted by $T_{1,2}$, and the running time that the second signal 12 takes from the second site 2 up to the input of the detector device 31 of the first site 1 is denoted by $T_{2,1}$. In this embodiment, it is assumed that the running time $T_{1,2}$ is equal to the running time $T_{2,1}$, since the first line 41 runs directly next to the second line 42, so that signals which run on these two lines 41, 42 exhibit virtually no running time differences. Since in one embodiment, the two lines 41, 42 run as closely as possible next to one another, this ensures that manufacturing process fluctuations that affect specific regions of the digital circuit differently with regards to the running time affect both lines 41, 42 in the same way.

FIG. 2 illustrates two D flip-flops 31, 32, which are the detector devices at the first site 1 and at the second site 2 with which a phase shift between the first signal 11 and the second signal 12 is determined. FIG. 2a illustrates the D flip-flop 31 at the first site 1, to which flip-flop is fed the second signal 12l at the D input and the first signal 11 at the clock input, and which determines the sign $Vz_{2,1}$ of the phase shift between the first signal 11 and the second signal 12 at the first site 1, the sign $Vz_{2,1}$ being positive if an upward slope of the second signal 12 reaches the corresponding input of the D flip-flop 31 before an upward slope of the first signal 11 (if the second signal 12 is "quicker" than the first signal 11), as is illustrated in FIG. 3a.

Figure 2B:
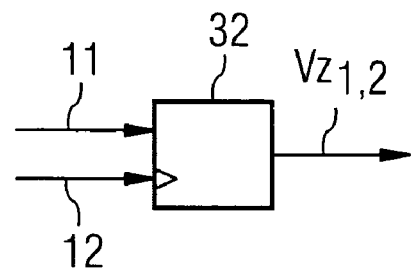
FIG. 2b illustrates a second detector device at a second site.
Figure 3A:
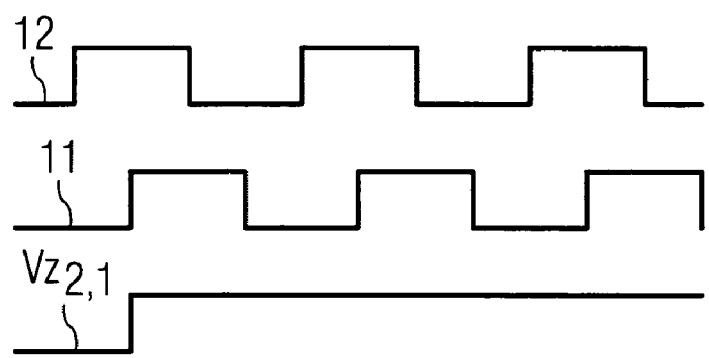
FIG. 3a illustrates a positive second phase shift at the first site

FIG. 2b illustrates the D flip-flop 32 of the second site 2, to which is fed the first signal 11 at the D input and the second signal 12 at the clock input, and which determines the sign $Vz_{1,2}$ of the phase shift between the first signal 11 and the second signal 12 at the second site 2. The sign $Vz_{1,2}$ is positive if an upward slope of the first signal 11 reaches the corresponding input of the D flip-flop 32 before an upward slope of the second signal 12 (if the first signal 11 is "quicker" than the second signal 12). The sign $Vz_{1,2}$ and $Vz_{2,1}$ of the phase shift is indicated in FIG. 2 in such a way that the first index denotes the site 1 or 2 of the digital circuit from which a first comparison signal 11 or 12 arrives, and the second index indicates the site 2 or 1 of the digital circuit at which the corresponding D flip-flop 32 or 31 is located, a second comparison signal 22 or 21 being associated with this site 2 or 1.

As has already been mentioned above, FIG. 3a illustrates the case where an upward slope of the second signal 12 reaches the D flip-flop 31 at the first site 1 before an upward slope of the first signal 11, so that with the upward slope of the first signal 11, which is present at the clock input of the D flip-flop 31, the digital value 1 which the second signal 12 adopts at this point in time, is loaded into the D flip-flop 31. This means, in the case of the signal progression illustrated in FIG. 3a, that $Vz_{2,1}$ is positive and the phase shift $x_{2,1}$ has a positive value.

Figure 3B:
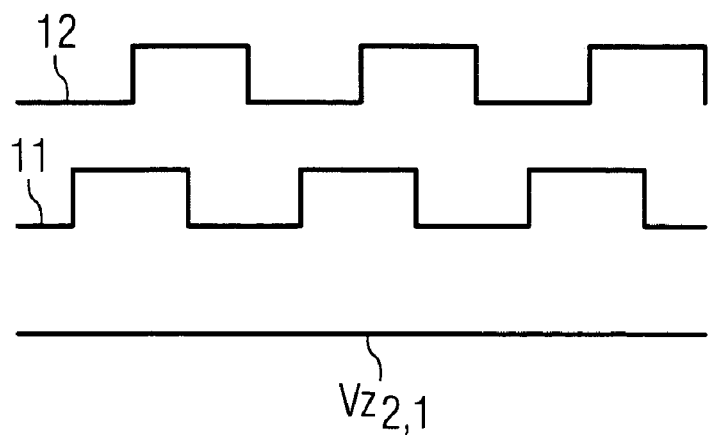
FIG. 3b illustrates a negative second phase shift at the first site.

Conversely, FIG. 3b illustrates the situation at a point in time when the first signal 11 exhibits its upward slope and the second signal 12 has the digital value 0, so that in each case the digital value 0 at each upward slope of the first signal 11 is loaded into the D flip-flop 31, with the result that the output of the D flip-flop 31 and thus the sign of the phase shift between the first signal 11 and the second signal 12 at the first site 1 has the digital value 0. This means that in the case of the signal progression illustrated in FIG. 3b that $Vz_{2,1}$ is negative, and that the phase shift $x_{2,1}$ has a negative value.

The determination of the phase shift $x_{2,1}$ between the first signal 11 and the second signal 12 at the first site 1 now takes place as follows. Initially, the individual delay $V_1$ is adjusted with the aid of the delay device 21 to an initial value. It is then checked whether the output of the D flip-flop 31 and thus the sign $Vz_{2,1}$ is positive or negative. If the sign is positive, (i.e., the second signal 12 is faster than the first signal 11), the individual delay $V_1$ is reduced by a predetermined duration and each time the output of the D flip-flop 31 is re-evaluated, until the sign is negative or changes. If the sign is negative directly after the initial step, (i.e., the first signal 11 is quicker than the second signal 12), the individual delay is raised stepwise by the predetermined duration and each time the output of the D flip-flop 31 is re-evaluated, until the sign is positive or changes. The arithmetic product of the predetermined duration and the number of steps that were necessary until a change of sign occurred indicates the amount of the phase shift between the first signal 11 and the second signal 12 at the first site 1, in which connection the sign of the phase shift is determined by whether the output of the D flip-flop 31 in the case where the individual delay was adjusted to the initial value, was 0 or 1. In the same way the phase shift between the first signal 11 and the second signal 12 at the second site 2 is determined with the aid of the D flip-flop 32 by a corresponding stepwise increase or reduction of the individual delay $V_i$ that is adjusted at the delay device 22 of the second site 2.

The phase shift between the first signal 11 at the first site 1 and the second signal 12 at the second site 2 is then determined with the aid of equation (6) and correspondingly the individual delay $V_1$ is adjusted with the aid of the delay device 21 and/or the individual delay $V_2$ is adjusted with the aid of the delay device 22, in such a way that the first signal 11 at the first site 1 is synchronized with the second signal 12 at the second site 2.

For the synchronization a signal (in this case the first signal 11 at the first site 1 or the second signal 12 at the second site 2) is not explicitly delayed by a specific time, but instead the signal is delayed corresponding to fractions of a clock period of this signal. It is therefore, in one embodiment, advantageous to operate with a predetermined fraction of this clock period instead of with the predetermined duration. In this case the individual delay is then likewise determined with fractions of the clock period and is increased or reduced by the predetermined fraction and each time the output of the D flip-flop is re-evaluated, until the sign changes. The advantage is that the individual delay then already has the corresponding fraction of the clock period, which means that no conversion from an absolute time, which is given for example in the time unit ps, to the fraction of the clock period has to be carried out.

Figure 4A:
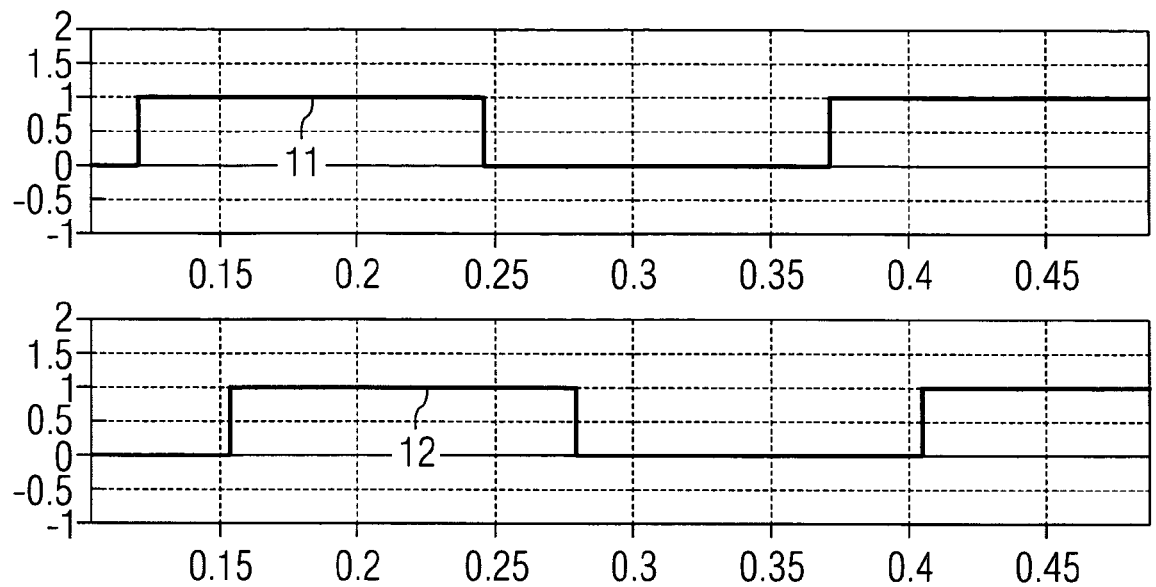
FIG. 4a illustrates a first signal at the first site and a second signal at the second site before a synchronization.

FIG. 4a illustrates the phase progression of the first signal 11 and of the second signal 12 before a synchronization. In this case the first signal 11 at the first site 1 is 350 ps faster than the second signal 12 at the second site 2. The running time of the first signal 11 from the first site 1 via the first line 41 up to the clock input of the D flip-flop 32 is 400 ps and corresponds to the running time of the second signal 12 from the second site 2 via the second line 42 up to the clock input of the D flip-flop 31. The predetermined duration is in this case adjusted to 100 ps. Under these preconditions the phase shift between the first signal 11 at the first site 1 and the second signal 12 at the second site 2 can be set at 350 ps, so that the phase progression of the first signal 11 at the first site 1 and of the second signal 12 at the second site 2 after a synchronization according to an embodiment are synchronized with one another, as is illustrated in FIG. 4b.

Figure 4B:
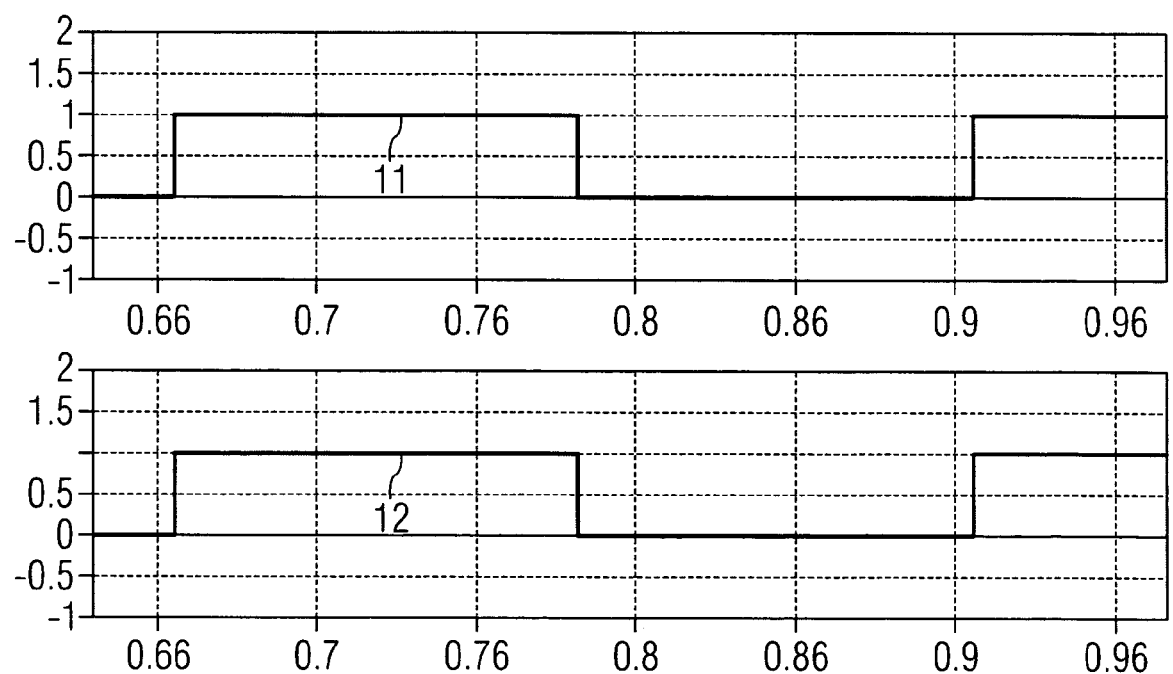
FIG. 4b represents the first signal at the first site and the second signal at the second site after a synchronization according to one embodiment.

Of course, the fact that in the example illustrated in FIGS. 4a and 4b the residual error amounts to 0 ps is accidental (and due to the quantities chosen for this example). In general, the residual error is at most half as large as a step width or the predetermined duration.

Figure 5:
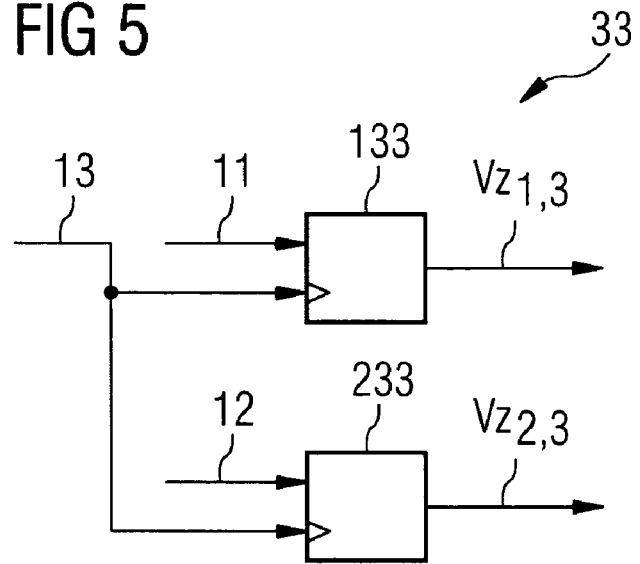
FIG. 5 illustrates a first detector device and a second detector device at a third site.

FIG. 5 illustrates in detail a phase detector apparatus 33 of the third site 3, which corresponds to the phase detector apparatus 34 at the fourth site 4 and the phase detector apparatus 35 at the fifth site 5. The phase detector apparatus 33 includes a first D flip-flop 133, to which is fed the first signal 11 at the data input and a third signal 13 at the clock input, and a second D flip-flop 233, to which is fed the second signal 12 at the data input and the third signal 13 at the clock input. The first D flip-flop 133 then determines whether the phase shift between the first signal 11 and the third signal 13 at the third site 3 is positive or negative, and the second D flip-flop 233 determines whether the phase shift between the second signal 12 and the third signal 13 at the third site 3 is positive or negative. The third signal 13 corresponds in this case to the signal to be synchronized at the third site 3. The sign $Vz_{1,3}$ or $Vz_{2,3}$ is positive if the output of the D flip-flop 123 or of the D flip-flop 233 adopts the digital value 1, otherwise it is negative.

The procedure for determining a first phase shift $x_{1,3}$ between the first signal 11 and the third signal 13 at the third site 3 as well as a second phase shift $x_{2,3}$ between the second signal 12 and the third signal 13 at the third site 3 corresponds to the procedure for determining the phase shift $x_{2,1}$ between the first signal 11 and the second signal 12 at the first site 1, which has been described above. An initialization value for the individual delay $V_3$ is initially adjusted in a first step via the delay device 23, and it is determined via the output of the first D flip-flop 133 whether the sign of the phase shift between the first signal 11 and the third signal 13 is positive or negative. Depending on the sign, the individual delay $V_3$ is increased or reduced with the aid of the delay device 23 by the predetermined duration, until the sign of the phase shift changes its value. The arithmetic product of the predetermined duration and the frequency with which the individual delay had to be increased or reduced until the change in sign occurred, gives the value of the phase shift between the first signal 11 and the third signal 13 at the third site 3. In this connection the sign of this phase shift is obtained from the sign before the change in sign. In the same way, the phase shift $x_{2,3}$ between the second signal 12 and the third signal 13 at the third site 3 is determined with the aid of the second D flip-flop 233, the individual delay likewise being predetermined by the delay device 23. In other words, with this modification it is not possible to determine simultaneously the phase shift between the first signal 11 and the third signal 13 at the third site 3, and the phase shift between the second signal 12 and the third signal 13 at the third site 3, since the delay device 23 is used in each case in order to determine these two phase shifts.

In the apparatus of FIG. 1 the phase shift $x_{1,4}$ between the first signal 11 and the fourth signal 14 at the fourth site 4, the phase shift $x_{2,4}$ of the second signal 12 and of the fourth signal 14 at the fourth site 4, the phase shift $x_{1,5}$ of the first signal 11 and of the fifth signal 15 at the fifth site 5, and the phase shift $x_{2,5}$ between the second signal 12 and the fifth signal 15 at the fifth site 5 are determined in the same way.

By using equation (13) given above, the individual delay $V_i$ ($i \in \{2,3,4\}$) for each signal at the corresponding site can be determined from the first phase shift $x_{1,i}$ and the second phase shift $x_{2,i}$ as well as from a knowledge of the running time $T_{2,1}$ (equal to the running time $T_{1,2}$) (for the calculation of $T_{1,2}$ and $T_{2,1}$, see equation (8)). If this individual delay $V_i$ for each signal is adjusted with the aid of the respective delay device 23-25, the first signal 11 at the first site 1, the second signal 12 at the second site 2, the third signal 13 at the third site 3, the fourth signal 14 at the fourth site 4 and the fifth signal 15 at the fifth site 5 are synchronized with one another.

Figure 7A:
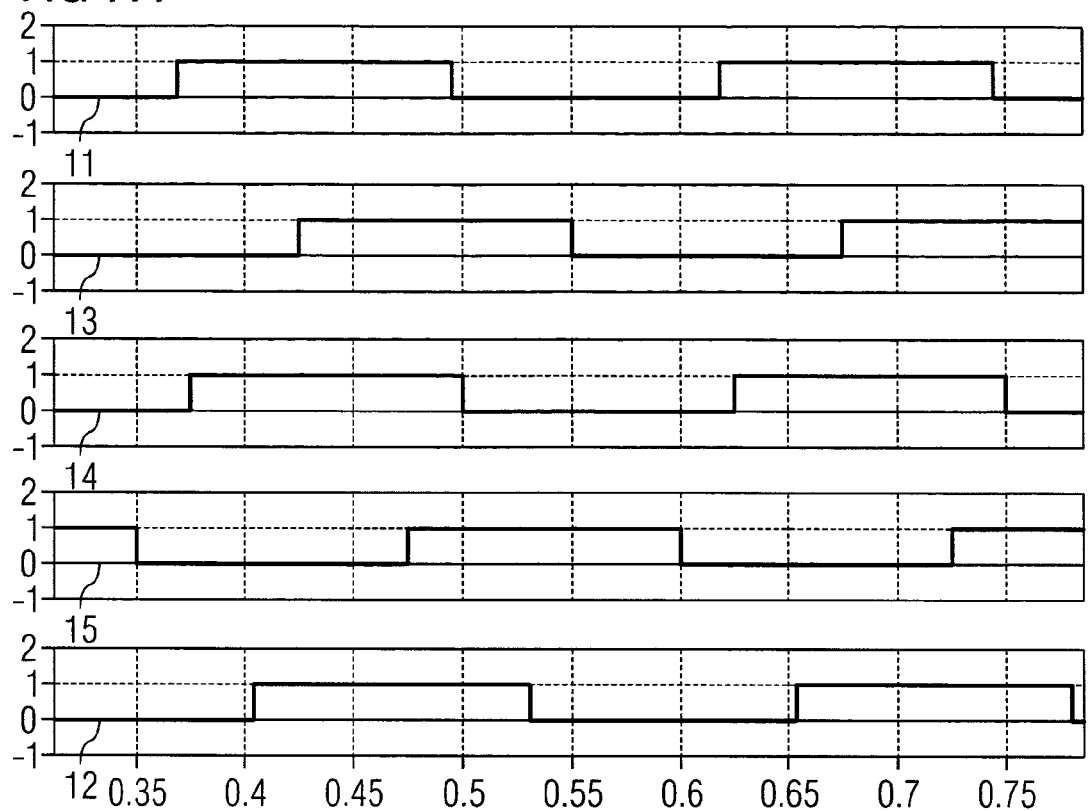
FIG. 7a illustrates five signals at five different sites before a synchronization.

FIG. 7a illustrates the five signals 11-15 before the synchronization. In this case, the first signal 1 is 50 ps slower than the fourth signal 14, whereas the third signal 13 is 500 ps faster, the fifth signal 15 is 1000 ps faster and the second signal 12 is 300 ps faster than the fourth signal 14. The running time $T_{1,2}$ of the first signal 11 from the first site 1 up to the second site 2 is 400 ps and the running time $T_{2,1}$ of the second signal 12 from the second site 2 up to the first site 1 is 320 ps, which means that a running time error is intentionally assumed, since normally a difference between the running time $T_{1,2}$ and the running time $T_{2,1}$ is at least significantly smaller. Again, a step size of 100 ps was used as the predetermined duration for reducing or increasing the individual delay in order to determine the first phase shift $x_{1,i}$ and second phase shift $x_{2,i}$ at the respective site 1-5.

Figure 7B:
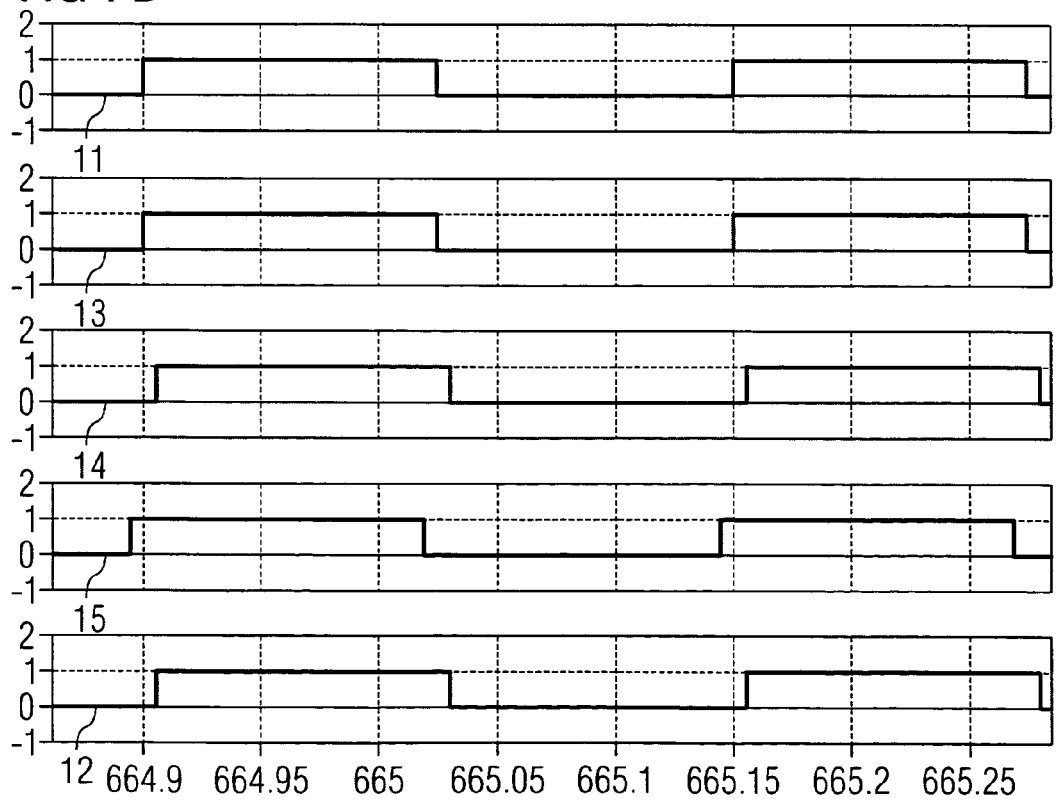
FIG. 7b illustrates the five signals at the five different sites after a synchronization according to one embodiment.

The results of a synchronization under these preconditions are given for the five signals 11-15 in FIG. 7b. It can be seen that although the signals are not optimally synchronized, nevertheless they are significantly better synchronized compared to the phase progressions illustrated in FIG. 7a.

The quality of a synchronization according one embodiment depends decisively on the accuracy with which an individual delay can be adjusted by means of the delay devices 21-25. The more accurately an individual delay can be adjusted, the smaller need be the predetermined duration and a step width for determining a phase shift, and the more accurately can the phase shift be determined and finally also the more accurately can a determined phase shift be corrected by the adjustment of an individual delay $V_i$.

In order to avoid ambiguities in the synchronization according embodiments, the method should typically only be used if the determined phase shifts are less than a quarter of a clock period length of the signals 11-15 to be synchronized. In other words, a digital circuit in which the method according to embodiments finds a maximum phase shift between two signals 11-15 to be synchronized that is greater than a quarter of the clock period length of these signals 11-15, should be regarded as defective. The method according to embodiments can thus be used as a test method for determining defective digital circuits.

Figure 8:
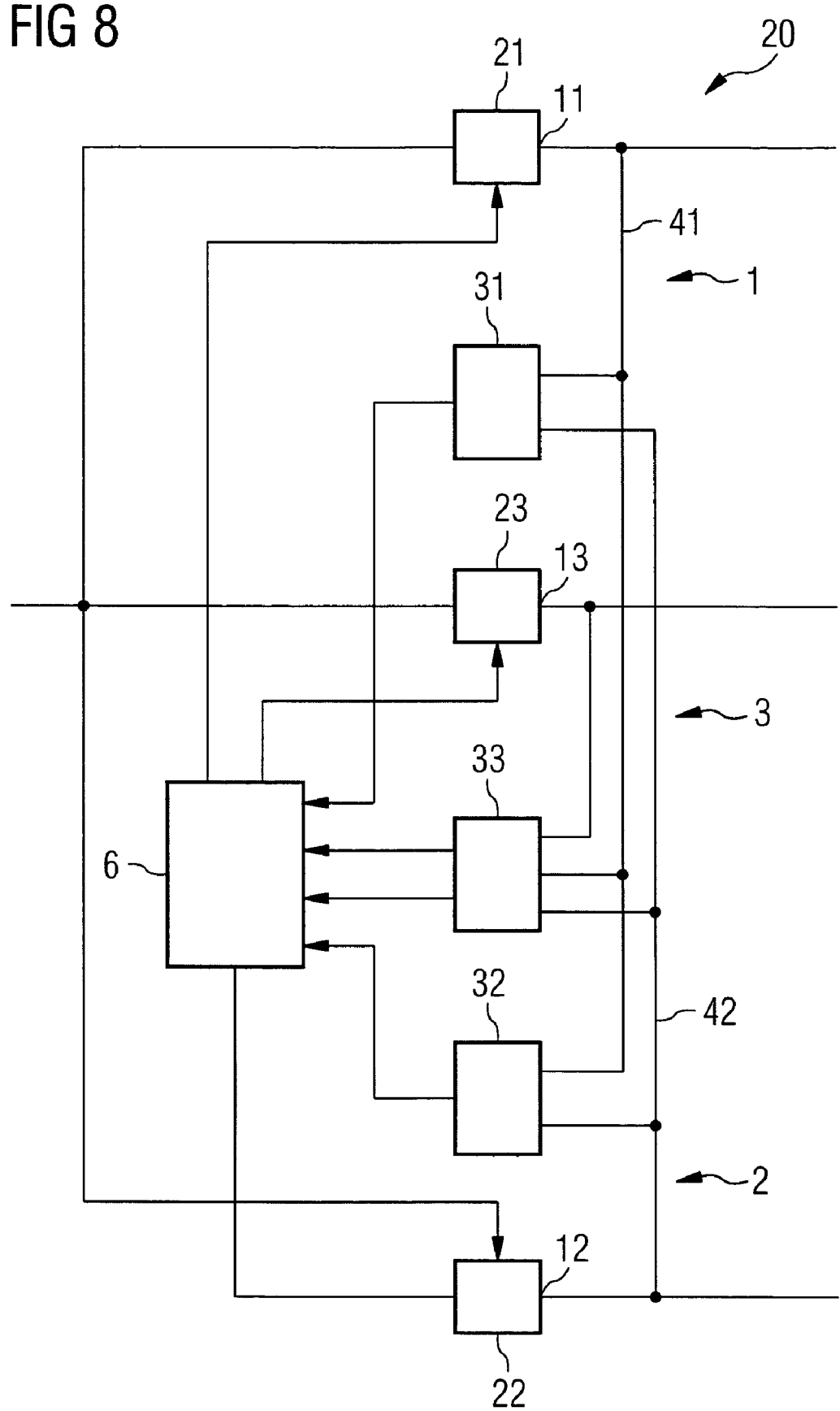
FIG. 8 illustrates an apparatus according to one embodiment with a controller for synchronizing a digital circuit.

One embodiment of an apparatus 20 for synchronizing a plurality of signals within a digital circuit is illustrated in FIG. 8. For the sake of simplicity, compared to the apparatus 10 illustrated in FIG. 1, in the apparatus 20 of FIG. 8 only three signals 11-13 at three different sites 1-3 are synchronized. The assembly otherwise corresponds, apart from the differences discussed below, to the assembly of the apparatus 10 in FIG. 1, and accordingly is not repeated here.

The essential difference between the apparatus 20 and the apparatus 10 is that the apparatus 20 of FIG. 8 in addition includes a control unit 6, with which the three signals 1-3 can be synchronized. Also, the control unit 6 is able to adjust the individual delay with the aid of the delay devices 21-23 and can evaluate the outputs of the D flip-flops of the detector devices 31-33, since the control unit 6 at the input side is connected to their outputs. The control unit 6 is thus able to determine the first phase shift $x_{1,i}$ and the second phase shift $x_{2,i}$ at an arbitrary site 1-3, by adjusting the individual delay $V_i$ at this site via the respective corresponding delay device 21-23 and increasing or reducing the delay stepwise, in which connection it monitors in each case the corresponding output of the D flip-flop until a change in sign occurs. After the control unit 6 has calculated the first phase shift $x_{1,i}$ and the second phase shift $x_{2,i}$ at each site (as has already been mentioned several times before, at the first site 1 only the second phase shift $x_{2,i}$ and at the second site 2 only the first phase shift $x_{1,2}$ are calculated), the control unit 6 can determine therefrom the individual delays $V_i$, which are adjusted with the aid of the respective delay device 21-23, so that the three signals 11-13 are then synchronized.

Figure 9:
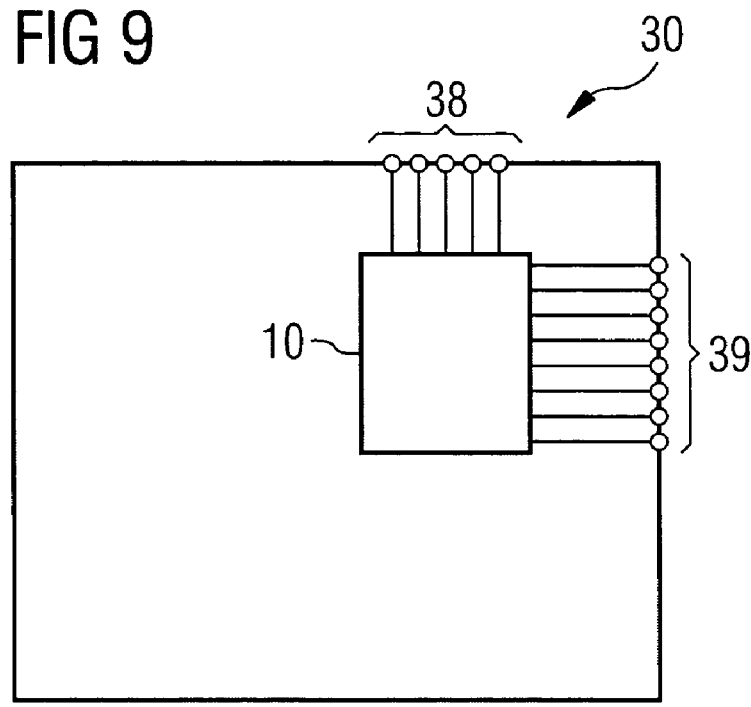
FIG. 9 illustrates a digital circuit according to one embodiment.

FIG. 9 illustrates a digital circuit 30 according to one embodiment, which includes the apparatus 10 illustrated in FIG. 1. Since the apparatus 10 has no control unit for carrying out the synchronization process itself according to embodiments, the outputs of the D flip-flops of the phase detector devices 31-35 and the inputs for adjusting the five delay devices 21-25 are accessible from outside, as indicated by the reference numerals 38 and 39. It is not necessary to have five and eight input connections and output connections respectively for the digital circuit 30. FIG. 9 is only intended to illustrate that the outputs of the D flip-flops of the phase detector devices 31-35 (see FIG. 1) can be accessed externally and that the delay devices 21-25 (see FIG. 1) can be adjusted externally.

Figure 10:
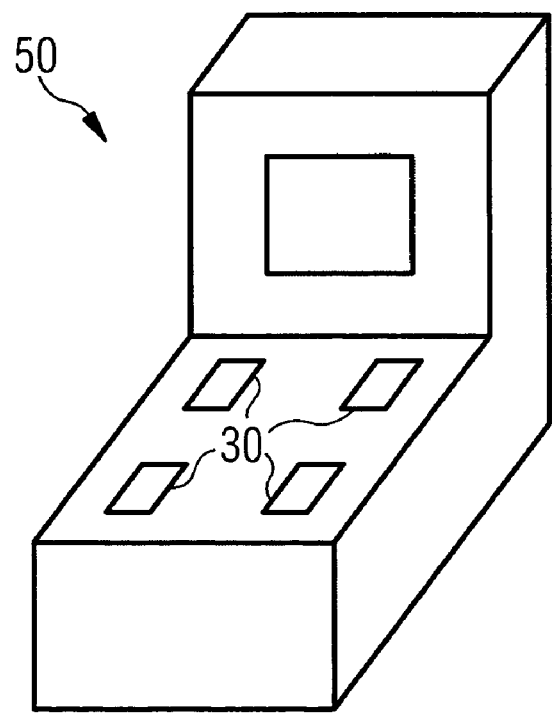
FIG. 10 illustrates an automatic apparatus according to the invention for the synchronization of digital circuits according to embodiments.

FIG. 10 illustrates an automatic apparatus according to one embodiment, with which a plurality of digital circuits 30 according to embodiments can be operated in such a way that within each of these digital circuits 30 a plurality of signals can be synchronized at different sites with the method according embodiments. In other words, the automatic apparatus 50 according to embodiments is designed so that it determines, via a corresponding adjustment of the delay devices 21-25 (in FIG. 1) and a corresponding evaluation of the detector devices 31-35 (in FIG. 1), an individual delay $V_i$ for each signal 11-15 to be synchronized (in FIG. 1), so that when the respective delay devices 21-25 (in FIG. 1) are adjusted to the respective individual delay $V_i$, the signals 11-15 (in FIG. 1) to be synchronized are synchronized with one another.

In one embodiment the automatic apparatus 50 is in addition designed to test the digital circuits 30. In this case, the automatic apparatus 50 could check whether the phase shift between two signals 11-15 (in FIG. 1) to be synchronized lies above a predetermined threshold value, and whether a digital circuit 30 should be regarded as defective, if this is the case.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of synchronization of a digital circuit, the method comprising:
   selecting a first site and a second site from a plurality of different sites of the digital circuit where a signal to be synchronized occurs;
   passing a first signal, which is the signal to be synchronized of the first site, via a first line that starts at the first site, ends at the second site, and contacts each of the sites just once, to the second site;
   passing a second signal, which is the signal to be synchronized of the second site, via a second line that starts at the second site, ends at the first site, and contacts each of the sites just once, to the first site;
   determining, for each site, a first phase shift between the signal to be synchronized of this site and the first signal, and a second phase shift between the signal to be synchronized of this site and the second signal; and
   determining, from the first and second phase shifts of each site, a delay for each site, with which the signal to be synchronized of the respective site is delayed for the synchronization.

2. The method according to claim 1, wherein a running time of the first signal from the first site to the second site is equal to a running time of the second signal from the second site to the first site.

3. The method according to claim 1, comprising:
   synchronizing the first signal at the first site with the second signal at the second site by determining only the second phase shift $x_{2,1}$ at the first site and the first phase shift $x_{1,2}$ at the second site, and wherein for the synchronization of the first signal and the second signal, if $x_{2,1} > x_{1,2}$, the second signal at the first site is delayed by $$\frac{x_{2,1} - x_{1,2}}{2}$$

and wherein, if $x_{2,1} < x_{1,2}$, the first signal at the second site is delayed by $$\frac{x_{1,2} - x_{2,1}}{2}.$$

4. The method according to claim 1, comprising:
   determining a running time $T_{1,2}$ of the first signal from the first site up to the second site, which essentially also corresponds to a running time $T_{2,1}$ of the second signal from the second site up to the first site, by measuring only the second phase shift $x_{2,1}$ at the first site and the first phase shift $x_{1,2}$ at the second site, and wherein:

$$T_{1,2} = T_{2,1} = -\frac{x_{2,1} + x_{1,2}}{2}.$$

5. The method according to claim 4, comprising:
   determining the delay $V_i$ of the ith site by the following formula:

$$V_i = \frac{T_{1,2} - (x_{2,i} - x_{1,i})}{2},$$

where $T_{1,2}$ is the running time of the first signal from the first site up to the second site, $x_{1,i}$ is the first phase shift of the ith site and $x_{2,i}$ is the second phase shift of the ith site, and wherein it is assumed that the first signal from the first site is synchronized with the second signal from the second site.

6. The method according to claim 1, comprising:
   determining at least one phase shift between two signals in such a way that a delay with which one of the two signals is delayed is altered stepwise in one direction until a change of sign of a phase shift having regard to the delay occurs, wherein the delay determined in this way corresponds to the phase shift between the two signals.

7. The method according to claim 6, wherein the delay is altered stepwise by a predetermined fraction of a clock period of the signals.

8. A method of synchronization of a digital circuit, the method comprising:
   providing a first signal at a first site of the digital circuit;
   providing a second signal at a second site of the digital circuit;
   passing the first signal via a first line that starts at the first site and ends at the second site;
   passing the second signal via a second line that starts at the second site and ends at the first site;
   determining, for the second site, a first phase shift between the second signal and the first signal;
   determining, for the first site, a second phase shift between the first signal and the second signal; and
   wherein for the synchronization of the first signal and the second signal, if $x_{2,1} > x_{1,2}$, the second signal at the first site is delayed by $$\frac{x_{2,1} - x_{1,2}}{2},$$

and wherein, if $x_{2,1} < x_{1,2}$, the first signal at the second site is delayed by $$\frac{x_{1,2} - x_{2,1}}{2}.$$

9. An apparatus configured to synchronize a digital circuit, in which in the synchronization a plurality of sites of the digital circuit are to be synchronized with regards to their signals that occur at these sites, the apparatus comprising:

detector devices, each detector device configured to recognize a sign of a phase shift between two signals present at their inputs, wherein a first site and at a second site of the plurality of sites in each case contain one of the detector devices and the remaining sites in each case contain a first detector device and a second detector device one delay device per site, with which the signal to be synchronized at this site can be delayed with an individual delay;

a first line to which a signal to be synchronized at the first site can be fed at the first site, which first line is in each case connected to an input of the first detector device of the remaining sites and which is connected to an input of the detector device at the second site; and a second line to which a signal to be synchronized at the second site can be fed at the second site, which second line is in each case connected to an input of the second detector device of the remaining sites and which is connected to an input of the detector device of the first site; and wherein a signal to be synchronized at the corresponding site can be fed to in each case a further input of each detector device.

10. The apparatus according to claim 9, wherein the apparatus is configured such that the first line and the second line run with a minimum possible interspacing between one another.

11. The apparatus according to claim 9, wherein each detector device in each case comprises:

a flip-flop for determining the sign of the phase shift of the respective two signals, wherein one of the respective two signals is fed to a data input and the other signal is fed to a clock input of the flip-flop.

12. The apparatus according to claim 9, wherein the apparatus comprises:

a control unit configured to determine for each detector device a phase shift of signals present at their inputs, and wherein on the basis of these phase shifts each delay device is adjusted in such a way that the signals to be synchronized are synchronized.

13. The apparatus according to claim 9, wherein the apparatus is configured to determine the phase shift of signals present at the inputs of one of the detector devices, it changes the individual delay stepwise in one direction starting from an initial delay, until the sign of the phase shift with respect to the individual delay changes, and wherein the individual delay that is present at the time of this change of sign is the phase shift to be determined.

14. The apparatus according to claim 9, wherein the apparatus is configured to changes the individual delay stepwise by a predetermined fraction of a clock period of the signals.

15. A digital circuit comprising:

an apparatus configured to synchronize a digital circuit, in which in the synchronization a plurality of sites of the digital circuit are to be synchronized with regards to their signals that occur at these sites, the apparatus comprising:

detector devices, each detector device configured to recognize a sign of a phase shift between two signals present at their inputs, wherein a first site and at a second site of the plurality of sites in each case contain one of the detector devices and the remaining sites in each case contain a first detector device and a second detector device one delay device per site, with which the signal to be synchronized at this site can be delayed with an individual delay;

a first line to which a signal to be synchronized at the first site can be fed at the first site, which first line is in each case connected to an input of the first detector device of the remaining sites and which is connected to an input of the detector device at the second site; and a second line to which a signal to be synchronized at the second site can be fed at the second site, which second line is in each case connected to an input of the second detector device of the remaining sites and which is connected to an input of the detector device of the first site; and wherein a signal to be synchronized at the corresponding site can be fed to in each case a further input of each detector device;

wherein the signals to be synchronized of the digital circuit are fed to the input side of the detector devices.

16. The digital circuit according to claim 15, wherein the digital circuit is configured such that, for each detector device, a sign of a phase shift is accessible from outside the digital circuit, and that the individual delay can be adjusted from outside the digital circuit.

17. An automatic apparatus for the synchronization of a digital circuit, the automatic apparatus comprising:

a plurality of sites of the digital circuit to be synchronized with respect to their signals that occur at these sites means for determining for each of a plurality of detector devices a phase shift of signals present at the inputs of the respective detector device, and wherein on the basis of these phase shifts the means calculates and adjusts the individual delay for each of a plurality of delay devices in such a way that signals to be synchronized are synchronized.

18. The automatic apparatus according to claim 17, comprising:

means for determining the phase shifts successively.

19. The automatic apparatus according to claim 17, comprising:

means for determining at least two phase shifts simultaneously.

20. The automatic apparatus according to claim 17, comprising:

means for adjusting the individual delays successively.

21. The automatic apparatus according to claim 17, comprising:

means for adjusting at least two individual delays simultaneously.

22. The automatic apparatus according to claim 17, comprising:

means for determining the phase shift of signals present at the inputs of one of the detector devices, and changing for at least one detector device the individual delay which is associated with the site of the detector device stepwise in one direction until the automatic apparatus recognizes that the sign of the phase shift with regard to the individual delay changes, and that the automatic apparatus recognizes the individual delay that exists at the time of this change of sign as the phase shift of this detector device to be determined.

23. The automatic apparatus according to claim 17, comprising:

means for determining for each detector device a phase shift of signals present at the inputs of the respective detector device, and that on the basis of these phase shifts it determines whether the digital circuit is defective or not.

24. The automatic apparatus according to claim 23, wherein means determines the digital circuit as defective, if it detects a phase shift which is greater than a quarter of a clock period length of the signals.

* * * * *